March 5, 1968  D. N. SEWELL  3,372,226
COAXIAL TRANSMISSION LINE GAS STOP
Filed Dec. 14, 1965
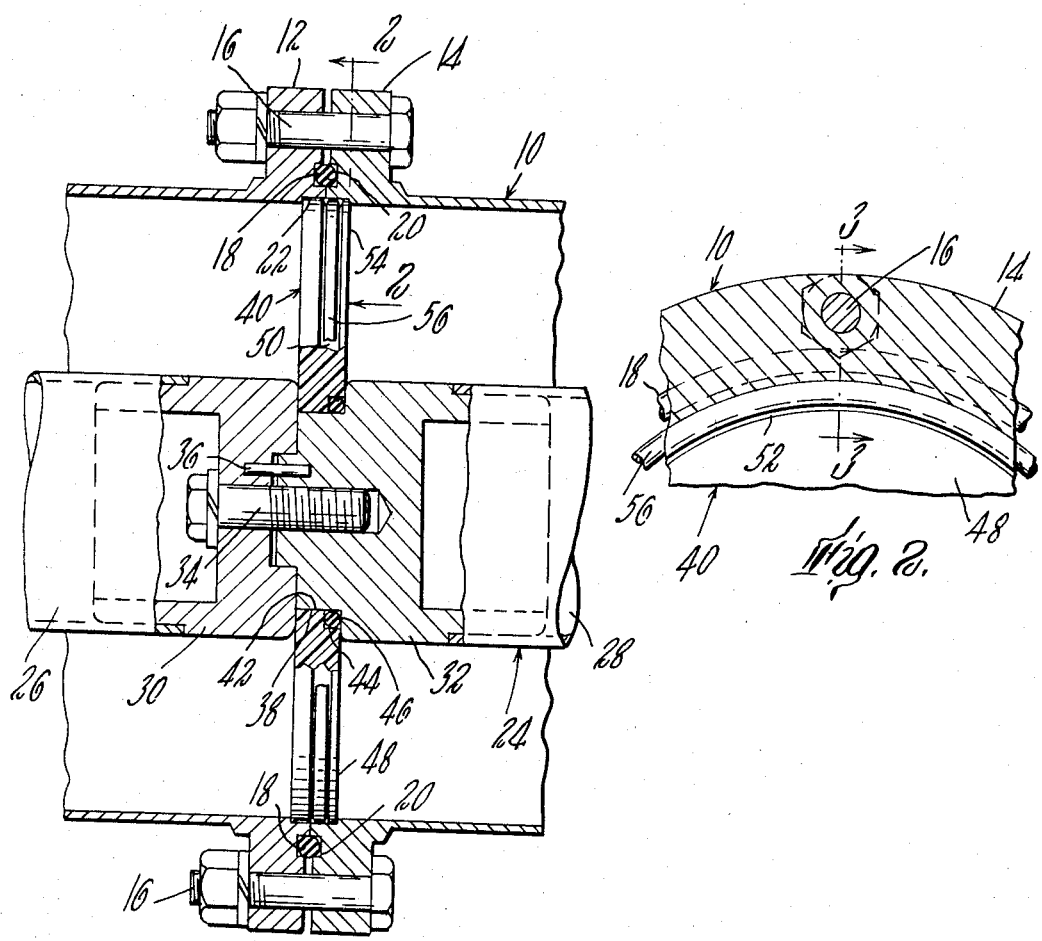
Fig. 1.
Fig. 2.
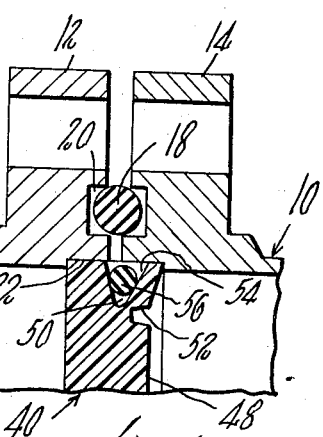
Fig. 3.
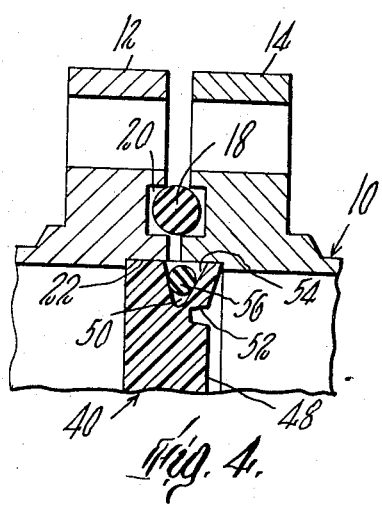
Fig. 4.

United States Patent Office 3,372,226
Patented Mar. 5, 1968

3,372,226
COAXIAL TRANSMISSION LINE GAS STOP
Donald N. Sewell, Acton, Mass., assignor to Dielectric Products Engineering Company, Inc., Littleton, Mass., a corporation of Michigan
Filed Dec. 14, 1965, Ser. No. 513,765
9 Claims. (Cl. 174—22)

ABSTRACT OF THE DISCLOSURE

A gas stop structure for replacing an anchor insulator of standard configuration without the necessity of modifying the joint of a coaxial transmission line comprises a Teflon disc having a groove in its inner periphery in which an O-ring member is received for sealing engagement with the inner conductor of the transmission line. A V-shaped groove is formed in the outer periphery of the disc off center of its width and a compensating groove is formed in one face of the disc adjacent the base of the V-shaped groove. This latter groove, in addition to providing electrical compensation, increases the flexibility of one wall of the V-shaped groove. A silicone rubber O-ring having a cross sectional area approximately three times the cross sectional area of the compensation groove, is disposed in the V-shaped groove and forces the flexible wall of that groove out so that the rubber O-ring lies entirely within the V-shaped groove. Thus the rubber O-ring does not interfere with assembly of the disc and inner and outer conductors, while clamping pressure on the walls of the disc at its outer periphery forces the rubber O-ring out into sealing relation with the outer conductor.

---

This invention relates to coaxial transmission lines and more particularly to a gas stop for preventing leakage of fluids from one portion of such a line to another portion thereof.

It is a principal object of this invention to provide a gas stop for coaxial transmission lines which will at once provide an efficient seal and low V.S.W.R., be simple in construction and of light weight. A particular object of this invention is to provide such a gas stop which is of size such that it will replace a standard sized element of a coaxial line without utilizing any special adaptors or connectors. Further objects are to provide a gas stop which may be manufactured from standard stock to standard tolerances and which utilizes standard sealing members in connection therewith. In short, it is desired to provide a gas stop which will be both simple to manufacture and exceedingly easy to use particularly in the field as a replacement member.

In general the gas stop is provided by a radially extending imperforate dielectric element conforming to the inner configuration of an outer tubular conductor of the transmission line. The peripheral edge of the dielectric element is provided with a groove thereabout adjacent one face of the element to receive a seal member therein having an outer dimension preferably smaller than that of the periphery, an inner dimension preferably greater than that of the base of the groove, and a cross-sectional dimension greater than the spacing between the walls of the groove. A compensatory annular groove is preferably positioned on said one face of the element adjacent the base of the peripheral groove to electrically compensate for the properties of the seal member and to enhance the flexibility of the lip thus formed in the element.

The dielectric element functions as a gas stop in combination with the coaxial transmission line which has inner and outer tubular conductors relatively coaxially positioned. The dielectric element is fitted in an inner circumferential channel about the outer tubular conductor with its sealing member in the peripheral groove of the element. The sides of the conductor channel tightly engage the faces of dielectric element to compress the sealing member against the sides of the peripheral groove and against the base of the conductor circumferential channel. In the preferred embodiment a reduced portion of the inner conductor is disposed in an opening in the dielectric element and embraces in sealing relation that portion of the dielectric element at the reduced portion. To provide positive sealing at the inner conductor the dielectric element receives a sealing member at that point which is compressed against the inner conductor.

Other objects, features and advantages of this invention will be apparent to those skilled in the art from the following detailed description of a preferred embodiment thereof together with the accompanying drawings in which:

FIG. 1 is a fragmentary, partially sectional elevation of a portion of a transmission line embodying this invention;

FIG. 2 is a fragmentary sectional view along the line 2—2 of FIG. 1;

FIG. 3 is a fragmentary sectional view on an enlarged scale along the line 3—3 of FIG. 2; and FIG. 4 is a view similar to that of FIG. 3 showing a stage of assembly of the transmission line embodying the invention.

The coaxial transmission line illustrated in FIGS. 1 and 2 includes coaxially arranged outer and inner tubular conductors generally designated respectively 10, 24. The conductors 10, 24 are in sections of corresponding lengths and have spaced joints transversely aligned.

The outer conductor 10 at its joint includes flanges 12, 14 of adjacent sections thereof and fastening means 16 for holding flanges 12, 14 firmly together. An O-ring 18 is provided in a groove 20 between the flanges to provide a seal at the joint from the atmosphere. An inner circumferential recess is likewise provided at the joint at the end of each outer conductor section. The opposed inner circumferential recesses when the joint is assembled form a channel 22 of width substantially the same as the body width of dielectric member 40.

Inner tubular conductor 24 includes tubular portions 26, 28 and anchor connector members 30, 32 forming the joint between adjacent tubular portions 26, 28. Tubular portions 26, 28 fit over reduced outer ends of members 30, 32. Members 30, 32 are fastened by fastening means 34 and are fixed against relative rotative motion by pin 36. A reduced portion of at least one of members 30, 32 provides recess 38 at the joint therebetween transversely aligned with and of width equal to the circumferential channel 22 of the outer conductor 10.

Dielectric element 40 comprises an imperforate disc of a dielectric material, preferably polytetrafluoroethylene (Teflon), radially extending to the base of circumferential groove 22. Element 40 is provided with an aperture 42 snugly fitting about the base of recess 38 of inner tubular member 24. Annular groove 44 is provided preferably at a corner of element 40 and a sealing member, O-ring 46, is positioned therein for sealing contact between recess 38 and groove 44. Of course to provide the requisite sealing action the cross sectional diameter of O-ring 46 is slightly greater than a dimension of groove 44. For ease of mounting, however, and to avoid damage to the O-ring, the inner diameter thereof is preferably greater than that of recess 38 of inner tubular member 30 and the radial width of groove 44 in dielectric element 40 is greater than the cross sectional diameter of O-ring 46 so as to exert no compressive force on the O-ring. Thus, the sealing action is between the O-ring 46 and opposed radial walls of recess 38 and groove 44, these walls being spaced a distance less than the cross sectional diameter of the O-ring.

To provide the requisite sealing action at the outer periphery of dielectric element 40, a groove 50 is provided in that periphery of dielectric element 40. Peripheral groove 50 is positioned adjacent one face 48 of element 40 to provide at least one flexible lip 54 at groove 50.

An O-ring 56 is positioned in peripheral groove 50 to effect the seal between element 40 and outer conductor 10. The outer diameter of O-ring 56 in an unstressed condition is slightly smaller than that of channel 22 and element 40 so that damage to the O-ring during assembly is prevented. The O-ring 56 has a cross sectional diameter greater than the distance between the walls of peripheral groove 50 which contact the O-ring 56. Prior to complete assembly, therefore, the lip 54 at groove 50 is forced outwardly as in FIG. 4. To provide additional flexibility of lip 54, an annular groove 52, FIGS. 2, 3 and 4, is provided in the one face 48 of element 40 adjacent the base of peripheral groove 50 producing an annular hinge element.

Annular groove 52 also functions to compensate electrically for the O-ring 56 in groove 50, the effective undercut (channel 22) in outer conductor 10, and the effective undercut (recess 38) in the inner conductor 24. The area of groove 52 is related to the area of O-ring 56 and the relative dielectric constants of the two materials, and is about 35% of the O-ring area where the support disc is made of Teflon and the O-ring is made of silicone rubber compound. For purposes of illustration in a particular embodiment, with a disc of 6.343" O.D. and 1.880" I.D., groove 44 has a depth of 0.090" and a radial width of 0.145"; groove 50 has a width at its base of 0.06", a width at the periphery of 0.162", and a depth of 0.190"; while groove 52 has a depth of 0.062" and an average width of 0.06". The O-ring 56 used with this support has a circular cross section of 0.139" and an I.D. of 5.740".

When flanges 12, 14 of outer conductor 10 are drawn together as in FIG. 3, force, transmitted through the walls of channel 22, moves the lip 54 to exert compressive force against O-ring 56. O-ring 56 is in turn forced outwardly against circumferential channel 22 to effectuate a positive seal. To assure positive sealing against circumferential channel 22, a contacting portion of groove 50 underlies O-ring 56 and likewise no portion of groove 50 overlies O-ring 56. In the preferred embodiment, the side walls of groove 50 are tapered to provide a V-shaped groove which produces a positive radial force component moving O-ring 56 toward channel 22 as lip 54 is forced inwardly while providing space below the O-ring into which any excess O-ring material may be forced.

To assemble a transmission line incorporating the novel gas stop, inner tubular portion 28 and connector 32 are coaxially positioned inside the section of outer conductor 10 having flange 14. O-rings 46, 56 are positioned in grooves 44, 50 of dielectric disc 40 which is then positioned in the portions of channel 22 and recess 38 carried by conductor 10 and connector 32. Connector 30 is then secured by fastener 34 to connector 32 compressing O-ring 46 in recess 38 for sealing. Tubular conductor portion 26 is mounted on connector 30 and the portion of outer conductor 10 having flange 12 is disposed over inner conductor section 26 and moved to engage dielectric element 40 as in FIG. 4, O-ring 18 having first been positioned in groove 20. Fastening means 16 are then tightened compressing O-rings 18, 56 for sealing as in FIG. 3.

A gas stop of this character may be fabricated from standard size stock to standard tolerances and standard size O-rings may be utilized therewith. The gas stop provides a highly efficient, light weight seal having requisite low V.S.W.R.

Other embodiments of this invention will occur to those skilled in the art which are within the spirit and scope of the following claims.

What is claimed is:
1. An electrical transmission line structure comprising:
   a first tubular conductor;
   a second conductor coaxially disposed within said first conductor;
   an annular channel in the inner surface of said first conductor;
   a dielectric element radially extending between said second conductor and said channel, said radially extending portion of said element being imperforate;
   a V-shaped groove extending around the periphery of said element adjacent one face thereof, said groove having at least one wall angularly inclined outwardly toward said periphery and being adapted to receive an annular sealing member, the dimension between the portions of said groove walls contacting said sealing member being smaller than the dimension of said sealing member thereacross such that said contacting portions underlie said sealing member and one wall is forced axially by said sealing member; and
   an annular electrical compensating groove in said one face adjacent the base of said V-shaped groove providing an annular hinge element that permits one wall of said V-shaped groove to flex outwardly under the deforming influence of said sealing member;
   an annular sealing member in said groove, said sealing member having an outer diameter at least as small as the outer diameter of said dielectric element and being forced outwardly between contacting portions of the opposed walls of said groove and said channel for preventing transmission of fluid therepast.

2. The structure claimed in claim 1 in which:
   said second conductor has a recess transversely aligned with said circumferential channel;
   said dielectric element is positioned in said second conductor recess extending therefrom to said circumferential channel;
   a groove is provided in said dielectric element facing a wall of said second conductor recess;
   and a second sealing member is positioned in said wall facing groove for compression between such groove and said second conductor recess for preventing transmission of fluid therepast.

3. The structure claimed in claim 2 in which said wall facing groove is positioned at said one face and said second sealing member therein has an inner diameter greater than the corresponding inner diameter of said second conductor recess.

4. A dielectric element for use in an electrical transmission line comprising:
   a radially extending element of imperforate dielectric material having a peripheral configuration and dimension conforming to that of a channel in an outer tubular conductor of said transmission line adapted to receive said element;
   a V-shaped groove extending around the periphery of said element adjacent one face thereof, said groove having at least one wall angularly inclined outwardly toward said periphery and being adapted to receive an annular sealing member, the dimension between the portions of said groove walls contacting said sealing member being smaller than the dimension of said sealing member thereacross such that said contacting portions underlie said sealing member and one wall is forced axially by said sealing member; and
   an annular electrical compensating groove in said one face adjacent the base of said V-shaped groove providing an annular hinge element that permits one wall of said V-shaped groove to flex outwardly under the deforming influence of said sealing member.

5. The element claimed in claim 4 further including an annular sealing member disposed in said V-shaped groove, the ratio of the volume of said sealing member to the volume of said annular groove being a function of the ratios of the dielectric constants of said radially extending element and said sealing member.

6. The element claimed in claim 5 in which the outer diameter of said sealing member is at least as small as that of said periphery.

7. The element claimed in claim 6 having an aperture therein for receiving an inner tubular conductor of said transmission line and a groove in said element adjacent said aperture.

8. The element claimed in claim 7 in which said aperture groove is an annular groove in said one face.

9. The element claimed in claim 8 having a sealing member in said aperture groove, such member having an inner diameter greater than that of said aperture and a cross sectional dimension from said one face to the base of said aperture groove greater than that of said groove.

References Cited

UNITED STATES PATENTS 2,860,311  11/1958  Balian _____ 285—133 X

FOREIGN PATENTS 879,562  6/1953  Germany.
879,563  6/1953  Germany.
246,554  1/1926  Great Britain.

OTHER REFERENCES

Appl. 1,099,024, Feb. 9, 1961, Spinner.

LARAMIE E. ASKIN, *Primary Examiner.*

LEWIS H. MYERS, *Examiner.*

H. HUBERFELD, *Assistant Examiner.*